3,338,359
RATCHET LOAD BINDER CONSTRUCTION
Adam Baillie and Charles D. Robertson, Canton, Ohio, assignors to The Canton Manufacturing Company, Canton, Ohio, a corporation of Ohio
Filed Nov. 23, 1965, Ser. No. 509,299
7 Claims. (Cl. 192—43.1)

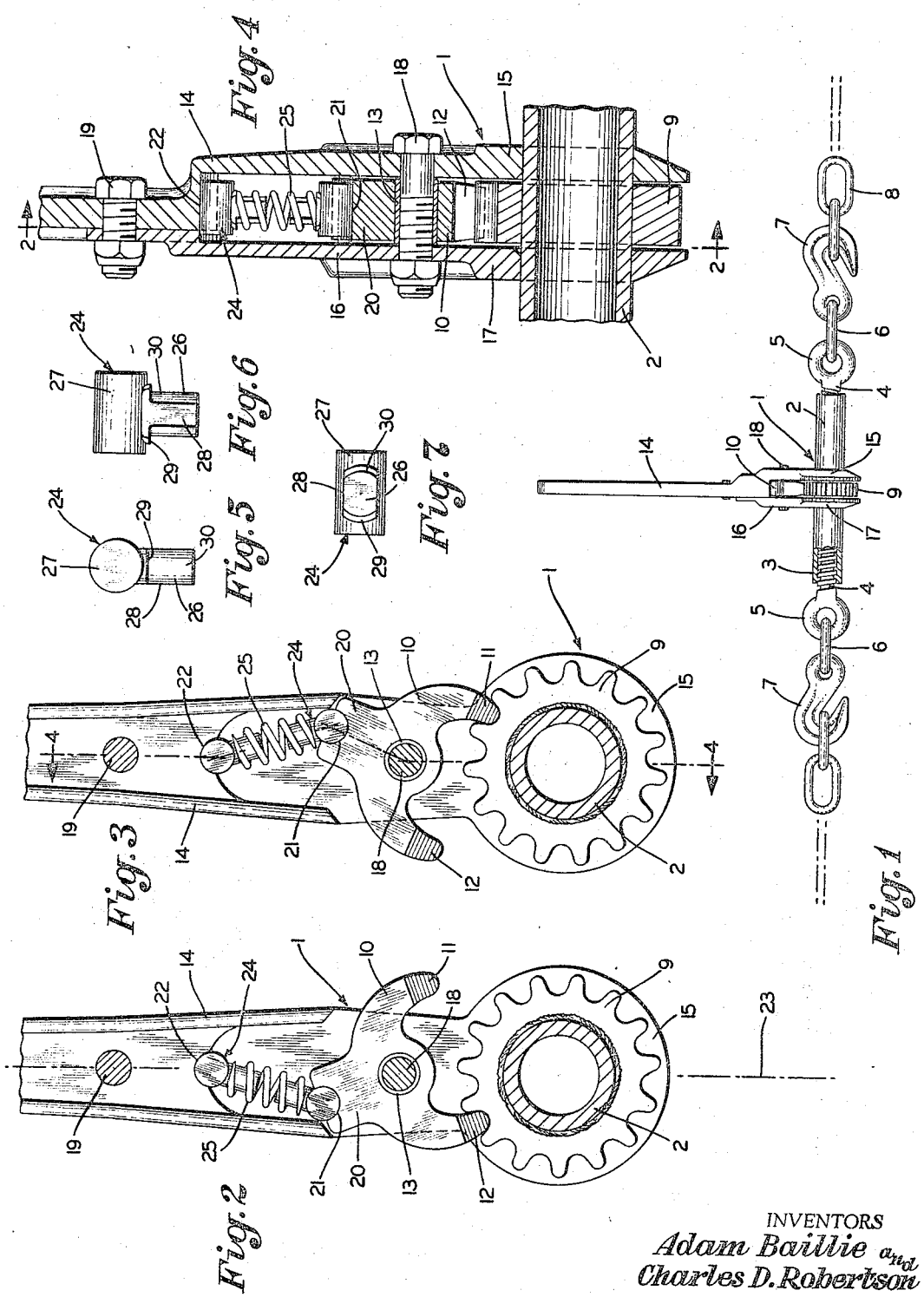

The invention relates to a ratchet-type turnbuckle load binder construction, and more particularly to a new double-ended pawl and pawl control mechanism for a ratchet-type load binder which provides substantially improved operation and avoids maintenance and failure problems as compared with prior structures.

An extensively used prior ratchet-type binder (Patent No. 2,673,632) utilizes control mechanism for the double-ended pawl that actuates the ratchet comprising an aperture formed in the pawl in which a hook at the end of a coil spring is engaged, with the other coil spring end telescoped over a spring-positioning and anchoring member having a convex head engaged in a rounded socket formed in the load binder actuating handle. Spring pressure is transmitted from the handle to the pawl only through engagement of the wire hook of the spring in the pawl aperture, to control or maintain the position of the pawl at one or the other of its two adjusted positions.

This construction has limited and unsatisfactory bearing engagement between the anchoring member and handle and the spring and ear aperture forming the pawl control mechanism. This control mechanism is subject to failure by spring breakage, usually at the hook end, incident to shock stresses in the spring wire hook portion in transmitting pressure through the hook to the apertured ear of the pawl in the repeated adjustment of the pawl.

Accordingly, objectives of the invention are to provide an improved pawl control mechanism construction for ratchet-type load binders in which greatly improved and extended bearing engagement exists between the control mechanism pressure members, and the pawl and handle portions engaged by the pressure members; in which the pawl control mechanism spring is not subject to breakage or shock stresses causing breakage; in which the spring and pressure member components of the pawl control mechanism have a simplified construction avoiding special shapes, spherical heads, etc.; and which eliminates difficulties heretofore encountered in the art, achieves the stated objects simply, effectively and inexpensively, and solves problems and satisfies existing needs.

These and other objects and advantages apparent from the following description may be obtained, the stated results achieved, and the described difficulties overcome by the constructions, combinations, parts, elements, subcombinations and arrangements which comprise the present invention, the nature of which is set forth in the following general statement, a preferred embodiment of which— illustrative of the best mode in which applicants have contemplated applying the principles—is set forth in the following description and shown in the drawing, and which are particularly and distinctly pointed out and set forth in the appended claims.

The nature of the improved load binder construction may be stated generally as including in a ratchet-type load binder of a type having a double-ended pawl pivotally mounted on a load binder handle for selective engagement in each of two adjusted positions with a load binder ratchet wheel, a pawl control mechanism including a first generally cylindrical socket formed in the pawl on an axis spaced from and parallel with the pivot axis of the pawl; a similar second generally cylindrical socket formed in the handle on an axis parallel with the axis of said first socket; a pair of similar T-shaped pressure members each having a shank and a cylindrical boss at one end extending at 90° with respect to the axis of the shank and formed with a shoulder; a coil spring member having end portions; the pressure member shanks being received in opposed spaced relation respectively within the end portions of the spring with the spring end portions seated on said shoulders; the cylindrical boss of one pressure member being seated in the first socket; and the cylindrical boss of the other pressure member being seated in the second socket.

By way of example, an embodiment of the improved ratchet-type binder construction is shown in the accompanying drawing forming part hereof in which:

FIGURE 1 is a general somewhat diagrammatic view of a ratchet-turnbuckle type load binder for tensioning a chain;

FIG. 2 is an enlarged fragmentary sectional view taken on the line 2—2, FIG. 4;

FIG. 3 is a view similar to FIG. 2 showing the pawl in the other position;

FIG. 4 is a sectional view looking in the direction of the arrows 4—4, FIG. 3; and FIGS. 5, 6 and 7 are side, front and end elevations of the T-shaped pressure member used in the improved construction.

Similar numerals refer to similar parts throughout the drawing.

A ratchet-type load binder is indicated generally at 1 and may include a tubular sleeve 2 internally threaded at opposite ends with right and left-handed screw threads such as indicated at 3, in which the screw threaded shanks 4 of eye members 5 are received. Members 5 may have link connection at 6 with hooks 7 adapted selectively to engage links of a chain 8 to be tensioned. Rotation of sleeve 2 in one direction tightens chain 8 and rotation in the other direction loosens chain 8.

Member 2 is rotated by a ratchet mechanism including a ratchet wheel 9 fixed to sleeve 2 intermediate the sleeve ends, and a double-ended pawl 10 having spaced pawl teeth 11 and 12, pivotally mounted at 13 on handle member 14 having a ring-like head portion 15 surrounding sleeve 2 at one side of ratchet wheel 9 and having a detachable head closure member 16 also formed with a ring-like portion 17 surrounding sleeve 2 at the other side of ratchet 9. Handle member 14 and handle closure member 16 preferably are bolted together by bolt means 18 which forms the pivotal mounting 13 for pawl 10, and by a bolt 19.

The load binder parts thus far described are typical of prior ratchet-type load binder constructions, which in accordance with the invention are controlled by an improved pawl control mechanism. The improved pawl control mechanism involves specially formed sockets in the handle and pawl and simple similar spring controlled pressure members cooperating therewith.

Thus, double-ended pawl 10 is formed with a boss 20 aligned with pivotal mounting 13 for the pawl and extending in the opposite direction from teeth 11 and 12 and shaped symmetrically midway between the location of pawl teeth 11 and 12. The outer end of boss 20 is formed with a cylindrical recess or socket 21 on an axis parallel with the axis of pawl pivot mounting 13 A similar cylindrical recess or socket 22 is formed in handle member 14 on an axis parallel with the axis of pawl pivot mounting 13. As shown in FIGS. 2 and 3, the axes of socket 22, pivot mounting 13 and ratchet wheel 9 are aligned in a plane indicated by the dot-dash line 23 in FIG. 2. When the pawl is adjusted, socket 21 swings to one side or the other of said plane 23, depending upon which of the pawl teeth 11 and 12 is to be engaged with ratchet wheel 9, as shown.

The pawl control mechanism also includes a pair of similar T-shaped pressure members generally indicated at 24, and a coil spring 25. Each pressure member 24 (FIGS. 5, 6 and 7) has a shank 26 and a cylindrical boss 27 at one end of shank 26 extending at 90° with respect to the axis of the shank. Shank 26 preferably is formed with flat side portions 28 and flat shoulders 29 at the intersection of the ends of the cylindrical boss 27 with the rounded portions 30 of shank 26.

Two pressure members 24 are assembled with a cut length of simple coil spring member 25 as shown, with pressure member shanks 26 received in opposed spaced relation within end portions of spring 25 and with the spring ends seated against shoulders 29.

Two pressure members 24 in spring-pressed relation with spring 25 form an assembly which is interposed between spaced sockets 21 and 22 with cylindrical boss 27 of one pressure member 24 seated in socket 21 and cylindrical boss 27 of the other pressure member 24 seated in socket 22. This pawl control mechanism arrangement permits pawl 10 to be adjusted to either of the two positions shown in FIGS. 2 and 3, and to be controlled or held in such adjusted positions.

Furthermore, the cylindrical bosses 27 and the seating of the spring ends on shoulders 29 of pressure members 24 permit bosses 27 to rotate through a considerable arc with extended bearing engagement in spaced sockets 21 and 22 without any interference of the spring with the engaged bearing surfaces. From another standpoint, there is no direct spring engagement or contact with any of the surfaces, bearing or otherwise, of the sockets or cylindrical bosses or handle or pawl. Thus, the spring member 25 is not subjected directly to twisting, bending or frictional wear, but only performs a usual pressure function with pressure exerted at each spring end against a flat shoulder on a pressure member.

Handle members 14 and 16, as well as pawl 10 and pressure members 24 preferably are formed as malleable castings or as forgings. To reduce costs, the minimum amount of machining other than tumbling or grinding to produce finished parts is desirable. The improved pawl control mechanism has extended bearing contact between the cylindrical bosses 27 of pressure members 24 and pawl and handle sockets 21 and 22 without requiring extensive machining operations. This results in a very sturdy and efficient construction which may be lubricated readily with selected lubricant when required and which exerts continuous positive pressure between the handle and pawl from the compression spring 25 to hold the pawl in either of the two adjusted positions for loosening or tightening chain 8 by turning of the ratchet-type turnbuckle load binder in one direction or the other through handle manipulation.

Furthermore, the improved pawl control mechanism construction avoids conditions which have rendered prior devices subject to spring breakage because coil spring 25 seats at its ends against shoulders 29 and is maintained under compression at all times in accordance with the normal functional arrangement of a compression coil spring.

The arrangement of the T-shaped pressure members 24 renders the members interchangeable in the assembly of the control mechanism, and renders the control mechanism spring and pressure member assembly interchangeable end for end.

Further, the flat shank side portions 28 and flat shoulders 29 formed on the pressure members 24 permit ease and retention of assembly of members 24 with a spring 25, and ease in engaging the assembly with sockets 21 and 22, without requiring extensive finishing operations.

Accordingly, the improved construction is sturdy; provides positive pressure control extending over a considerable engaged area of the pawl, for in holding the pawl in either adjusted position; provides more efficient and extended bearing contact between the control mechanism and the load binder handle and pawl; and generally avoids difficulties, eliminates breakage and solves problems existing in the art.

In the foregoing description, certain terms have been used for brevity, clearness, and understanding; but no unnecessary limitations are to be implied beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the new load binder devices may be manufactured, the characteristics of the new construction, and the advantageous, new and useful results obtained; the new and useful constructions, combinations, parts, elements, subcombinations, and arrangements and mechanical equivalents obvious to those skilled in the art are set forth in the appended claims.

We claim:

1. In a ratchet-type load binder of a type having a double-ended pawl pivotally mounted on a load binder handle for selective engagement in either of two adjusted positions with a load binder ratchet wheel; pawl control mechanism including first socket engagement means formed in the pawl spaced from and extending parallel with the pawl pivot axis and movable with the pawl; similar second socket engagement means formed in the handle extending parallel with the first socket engagement means and the pawl pivot axis, and fixed in spaced relation with respect to said pawl pivot axis; a pair of similar pressure members, each pressure member having a shank, a boss at one shank end having a cylindrical portion extending at 90° with respect to the axis of the shank, and a shoulder formed at the intersection of the shank with the boss; a coil spring member having end portions; the pair of pressure members being assembled with the coil spring member with pressure member shanks received in opposed spaced relation within end portions of the spring and with the spring end portions seated on said pressure member shoulders; the boss of one pressure member being seated in the first socket means; and the boss of the other pressure member being seated in the second socket means.

2. The construction defined in claim 1 in which the first and second socket engagement means are formed to have a generally cylindrical shape on axes parallel with and spaced from the pawl pivot axis.

3. The construction defined in claim 1 in which the pressure members each are T-shaped.

4. The construction defined in claim 1 in which the boss of each pressure member is cylindrical.

5. The construction defined in claim 1 in which the shoulder formed at the intersection of the shank with the boss of each pressure member is flat.

6. The construction defined in claim 1 in which the shank of each pressure member has opposed flat surfaces and intervening opposed curved surfaces, and in which pressure member shoulders are formed at the intersection of the curved shank surfaces with the boss.

7. The construction defined in claim 1 in which the first and second socket engagement means are formed to have a generally cylindrical shape on axes extending parallel with the pawl pivot axis, in which the pressure members are T-shaped, in which the pressure member bosses are cylindrical, and in which the pressure member shoulders are flat.

References Cited

UNITED STATES PATENTS

| | | | |
|---|---|---|---|
| 414,114 | 10/1889 | Hostler | 192—43.1 |
| 633,880 | 9/1899 | Miller. | |
| 2,673,632 | 3/1954 | Stiranka | 192—43.1 |

MARK NEWMAN, *Primary Examiner.*

A. T. McKEON, *Assistant Examiner.*